United States Patent [19]

Kanda

[11] Patent Number: 5,299,788
[45] Date of Patent: Apr. 5, 1994

[54] FLUID-FILLED CYLINDRICAL ELASTIC MOUNT HAVING ORIFICE PASSAGES AND VOIDS FORMED IN ELASTIC BODY

[75] Inventor: Ryouji Kanda, Komaki, Japan

[73] Assignee: Tokai Rubber Industries, Ltd., Japan

[21] Appl. No.: 804,732

[22] Filed: Dec. 11, 1991

[30] Foreign Application Priority Data

Dec. 13, 1990 [JP] Japan .................................. 2-410498
Nov. 13, 1991 [JP] Japan .................................. 3-325327

[51] Int. Cl.[5] ............................................. F16F 13/00
[52] U.S. Cl. .................................. 267/140.12; 248/562
[58] Field of Search ................... 267/140.11, 140.12, 267/140.4, 141.2, 141.4, 136, 35, 219, 152; 248/562, 636; 180/300, 312

[56] References Cited

U.S. PATENT DOCUMENTS

| | | | |
|---|---|---|---|
| 3,975,007 | 8/1976 | Chorkey | 267/141.4 X |
| 4,632,372 | 12/1986 | Nakajima et al. | 248/562 X |
| 4,667,942 | 5/1987 | Bitschkus et al. | 267/140.12 |
| 4,700,934 | 10/1987 | Andra et al. | 267/140.12 |
| 4,717,111 | 1/1988 | Saito | 267/140.12 X |
| 4,749,173 | 6/1988 | Kanda | 248/562 X |
| 4,756,514 | 7/1988 | Kanda | 267/140.12 |
| 4,786,036 | 11/1988 | Kanda | 267/140.12 |
| 4,883,260 | 11/1989 | Kanda | 267/140.12 |
| 4,895,353 | 1/1990 | Roth et al. | 267/140.12 |
| 4,957,279 | 9/1990 | Thorn | 267/140.11 X |

FOREIGN PATENT DOCUMENTS

| | | |
|---|---|---|
| 0199240 | 10/1986 | European Pat. Off. . |
| 3920891A1 | 1/1990 | Fed. Rep. of Germany . |
| 2600737 | 12/1987 | France . |
| 56-164242 | 12/1981 | Japan . |
| 0172743 | 9/1985 | Japan .................. 267/140.12 |
| 61-270533 | 11/1986 | Japan . |
| 62-274128 | 11/1987 | Japan . |
| 0193431 | 8/1989 | Japan .................. 248/562 |
| 2-240430 | 9/1990 | Japan . |
| 0121327 | 5/1991 | Japan .................. 267/219 |
| 2192968 | 1/1988 | United Kingdom . |
| 2221012A | 1/1990 | United Kingdom . |
| WO90/06455 | 6/1990 | World Int. Prop. O. . |

Primary Examiner—Robert J. Oberleitner
Assistant Examiner—Josie A. Ballato
Attorney, Agent, or Firm—Parkhurst, Wendel & Rossi

[57] ABSTRACT

A fluid-filled cylindrical elastic mount including an inner sleeve, an outer sleeve disposed radially outwardly of the inner sleeve, and a generally annular elastic body disposed between the inner and outer sleeves for flexible connection therebetween. The elastic body partially defines two fluid chambers filled with a non-compressible fluid. The fluid chambers are formed in diametrically opposite circumferential portions of the elastic body between the inner and outer sleeves. The elastic body has at least one orifice passage formed therethrough for fluid communication between the two fluid chambers, and extending through the elastic body, adjacent one of the inner and outer sleeves. The elastic body further has at least one void each formed between the corresponding orifice passage and the other of the inner and outer sleeves.

10 Claims, 5 Drawing Sheets

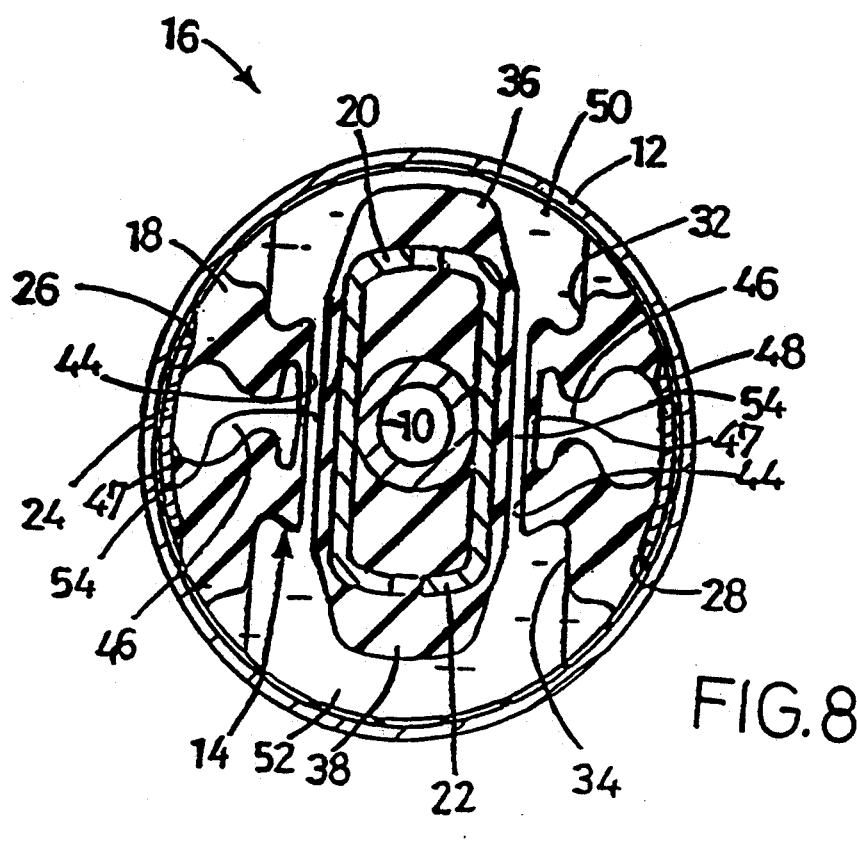

FLUID-FILLED CYLINDRICAL ELASTIC MOUNT HAVING ORIFICE PASSAGES AND VOIDS FORMED IN ELASTIC BODY

BACKGROUND OF THE INVENTION

1. Field of the Invention

The present invention relates in general to a fluid-filled cylindrical elastic mount which is suitably used for example as a suspension bushing or an engine mount for a motor vehicle, and which exhibits a desired vibration damping characteristic based on flow of a fluid contained therein.

2. Discussion of the Prior Art

A so-called cylindrical elastic mount is known as one type of a mounting device which is interposed between two members of a vibration system for flexibly connecting the two members in a vibration-damping fashion. This cylindrical elastic mount is constructed with an elastic or rubber body being formed between an inner metal sleeve, and an outer metal sleeve disposed radially outwardly of the inner sleeve with a suitable radial spacing therebetween. The elastic body elastically connects the inner and outer sleeves. The thus constructed cylindrical elastic mount exhibits an intended vibration damping effect, with respect to a vibrational load applied between the inner and outer sleeves in a direction perpendicular to the axis of the mount. The elastic mount of this type is widely used as a suspension bushing or an engine mount for a motor vehicle.

To meet increasing requirements for enhanced vibration damping/isolating characteristics on recent high-grade cars, there has been proposed a so-called fluid-filled cylindrical elastic mount having a plurality of fluid chambers formed between the inner and outer sleeves, and at least one orifice passage connecting these fluid chambers. Upon application of a vibrational load, relative pressure changes occur between the fluid chambers, whereby a fluid is forced to flow between the chambers through the orifice passage[s]. This fluid-filled elastic mount exhibits a significantly improved vibration damping effect based on resonance of the fluid mass in the orifice passage (s), as compared with the above elastic mount which relies only on elasticity of the elastic body for damping vibrations.

In the fluid-filled cylindrical elastic mount as described just above, the orifice passages may be formed between the inner sleeve, and a metallic orifice member fitted on the outer circumferential surface of the inner sleeve, as disclosed in JP-A-62-274128. Alternatively, the orifice passages may be formed between the outer sleeve, and a metallic orifice member fitted in the inner circumferential surface of the outer sleeve, as disclosed in JP-A-56-164242 and JP-A-61-270533.

However, these known elastic mounts require an exclusive orifice-defining member or members intended for forming an orifice passage or passages, resulting in an increased number of components of the elastic mount, and rather complicated construction of the mount. Further, there is limitation in space for forming the orifice passages by the orifice-defining member or members.

To solve the above problem, it is proposed to form a through-hole which extends through the elastic body to communicate with the fluid chambers, so as to provide an orifice passage. However, such an orifice passage tends to suffer from variation in its cross sectional area, due to deformation of the elastic body when the mount receives a dynamic vibrational load or a static load. Due to the phenomenon, the elastic mount exhibits an unstable or unreliable vibration damping characteristic, and is therefore unsuitable for practical use.

SUMMARY OF THE INVENTION

It is therefore an object of the present invention to provide a fluid-filled cylindrical elastic mount which is simple in construction, and which stably exhibits a desired vibration damping characteristic, based on flow of a fluid through an orifice passage formed therein.

The above object may be attained according to the principle of the present invention, which provides a fluid-filled cylindrical elastic mount for flexibly connecting two members, comprising (a) an inner sleeve fixed to one of the two members; (b) an outer sleeve disposed radially outwardly of the inner sleeve and fixed to the other of the two members; and (c) a generally annular elastic body disposed between the inner and outer sleeves for flexible connection therebetween, the elastic body partially defining two fluid chambers filled with a non-compressible fluid, the two fluid chambers being formed in diametrically opposite circumferential portions of the elastic body between the inner and outer sleeves. The elastic body has at least one orifice passage formed therethrough for fluid communication between the two fluid chambers and extending through the elastic body, adjacent one of the inner and outer sleeves. The elastic body further has at least one void each formed between the corresponding orifice passage and the other of the inner and outer sleeves.

The above-indicated at least one void may be formed so as to extend over the entire axial length of the elastic body.

In the fluid-filled cylindrical elastic mount of the invention constructed as described above, the orifice passage or passages is/are formed through the elastic body, which also partially defines the fluid chambers. Thus, the present elastic mount does not require any exclusive member for providing the orifice passage(s), and is therefore simple in construction. Further, there is substantially no spacial limitation in providing the orifice passage(s) in the elastic mount of the invention.

According to the present invention, the nominal shape of the orifice passage is advantageously maintained by the inner or outer sleeve located adjacent the orifice passage. In addition, since the void is present in a portion of the elastic body between the orifice passage and the inner or outer sleeve which is remote from the orifice passage, the orifice passage is substantially free from undesirable variation in its cross sectional area due to deformation of the elastic body at its portion remote from the inner or outer sleeve, which occurs upon application of a vibrational load to the mount. Accordingly, the present elastic mount stably exhibits an intended vibration damping characteristic based on resonance of the fluid mass flowing through the orifice passage.

BRIEF DESCRIPTION OF THE DRAWINGS

The above and optional objects, features and advantages of the present invention will be better understood by reading the following detailed description of presently preferred embodiments of the invention, when considered in connection with the accompanying drawings, in which:

FIG. 8 is an elevational view in transverse cross section of another embodiment of the present invention.

DETAILED DESCRIPTION OF THE PREFERRED EMBODIMENTS

Figure 1:
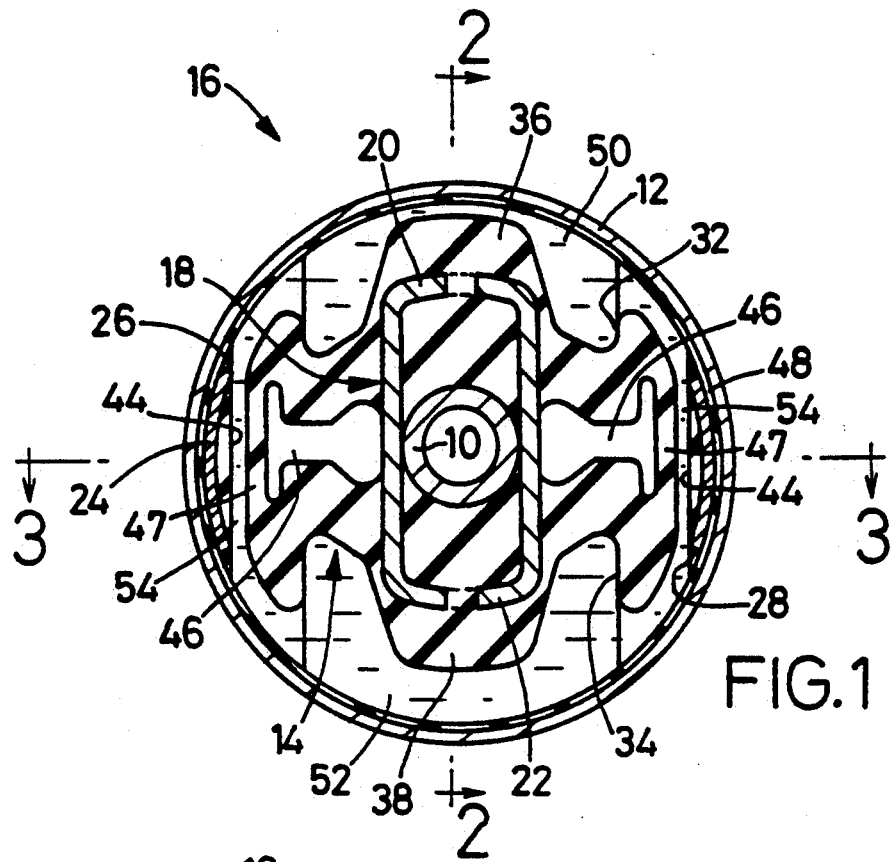
FIG. 1 is an elevational view in transverse cross section of one embodiment of a fluid-filled cylindrical elastic mount of the present invention in the form of an engine mount.
Figure 2:
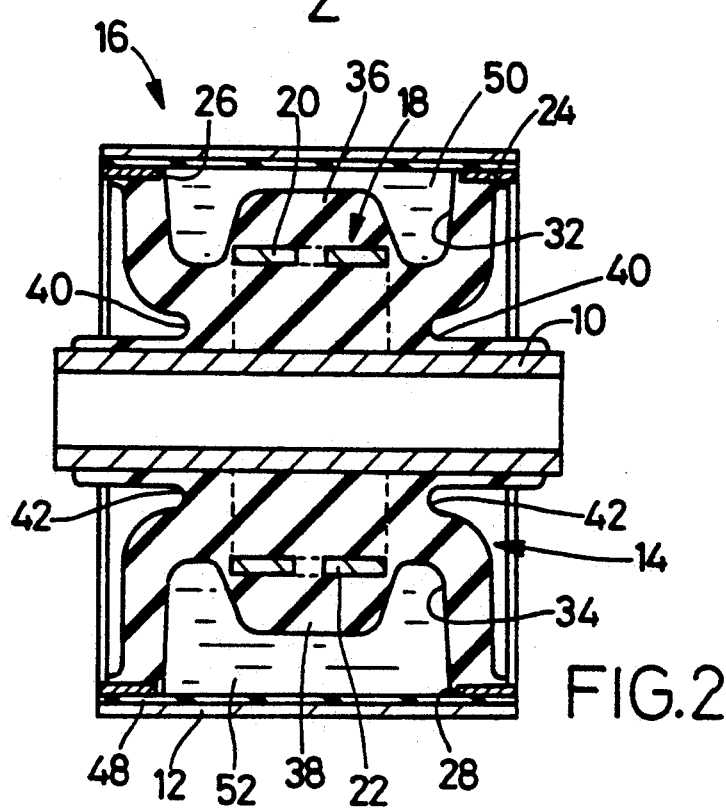
FIG. 2 is an elevational view in axial cross section of the engine mount taken along line 2—2 of FIG. 1.
Figure 3:
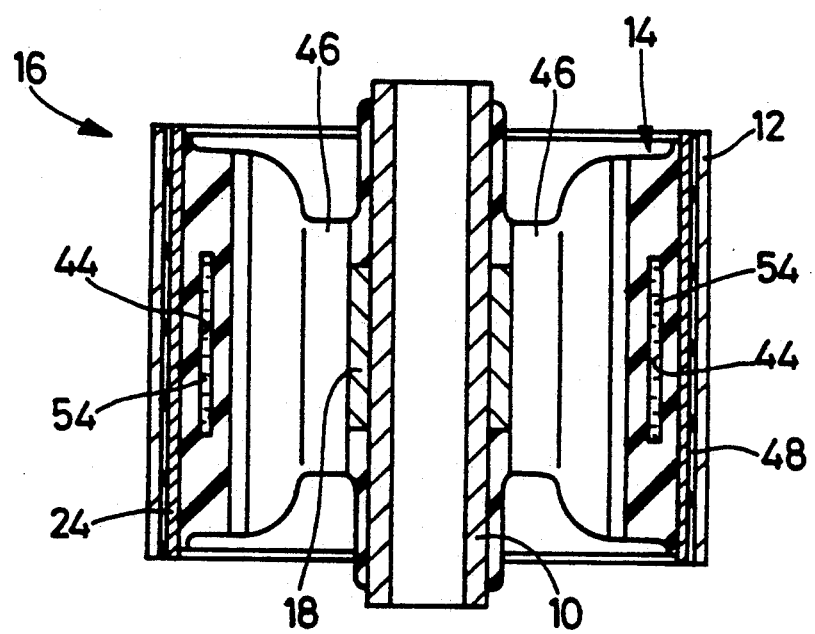
FIG. 3 is a cross sectional view taken along line 3—3 of FIG. 1.

Referring first to FIGS. 1-3, there is shown an engine mount 16 for a motor vehicle, which is constructed according to one embodiment of this invention. The engine mount 16 has an inner metal sleeve 10, and an outer metal sleeve 12 which is disposed radially outwardly of the inner sleeve 10 such that the axis of the inner sleeve 10 is eccentrically offset a suitable distance from the axis of the outer sleeve 12 in the radial or diametric direction in which a dynamic vibrational load is applied to the engine mount 16. The inner and outer sleeves 10, 12 are elastically connected to each other by an elastic body 14 formed therebetween.

The engine mount 16 is installed on the motor vehicle such that the inner sleeve 10 is fixed to a power unit of the vehicle which includes an engine while the outer sleeve 12 is fixed to the vehicle body, so that the power unit is flexibly mounted on the vehicle body, by means of the engine mount 16. In this condition, the weight of the power unit (i.e., static load) and a dynamic vibrational load act on the engine mount 16, in the diametric direction in which the inner and outer sleeves 10, 12 are eccentric from each other, i.e., in the vertical direction as seen in FIG. 1. This direction will be referred to as "load-receiving direction" where appropriate. With the static load applied to the inner sleeve 10, the inner and outer sleeves 10, 12 are substantially concentric or coaxial with each other.

Described in detail, the inner sleeve 10 is a generally cylindrical member having a relatively large wall thickness. A generally rectangular, frame-like stopper member 18 is fixed by welding on the outer surface of an axially intermediate portion of the inner sleeve 10, so as to provide a first and a second stopper portion 20, 22 which protrude suitable lengths from the inner sleeve 10, in the opposite radial directions perpendicular to the axis of the engine mount 16 and parallel to the load-receiving direction.

Radially outwardly of this inner sleeve 10, there is disposed an intermediate metal sleeve 24 in an eccentric relation with the inner sleeve 10 and in a concentric relation with the outer sleeve 12. The intermediate metal sleeve 24 is a cylindrical member which has a relatively large diameter and a relatively small wall thickness. The intermediate sleeve 24 has a first and a second window 26, 28 formed through diametrically opposite circumferential portions thereof, which are opposed to each other in the above-indicated load-receiving direction in which the inner and outer sleeves 10, 12 are eccentric from each other. The first and second stopper portions 20, 22 of the inner sleeve 10 protrude in the load-receiving direction towards these first and second windows 26, 28 of the intermediate sleeve 24.

Figure 4:
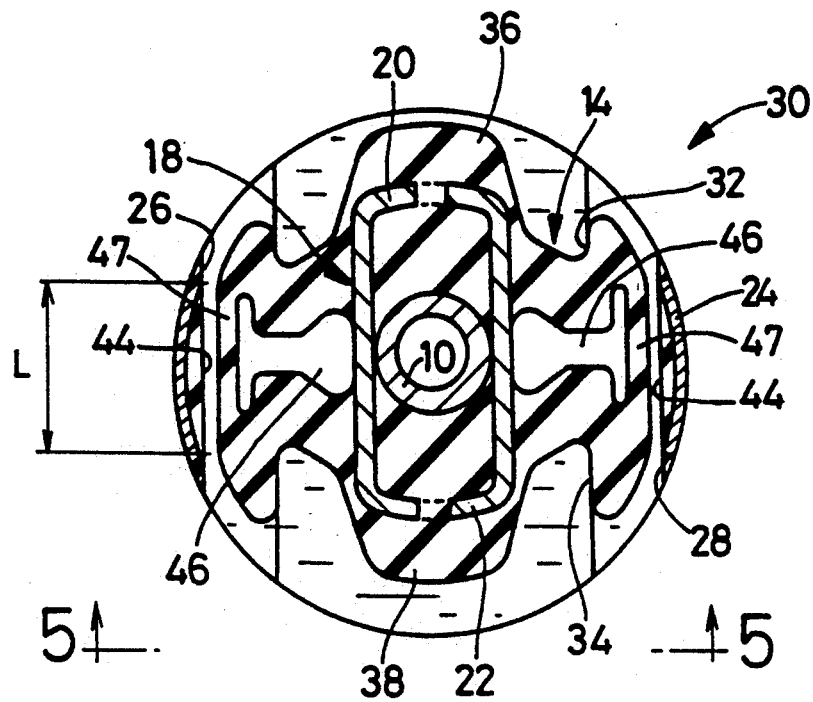
FIG. 4 is an elevational view in transverse cross section of an inner assembly of the engine mount of FIG. 1, which is prepared in a vulcanization process during manufacture of the engine mount.
Figure 5:
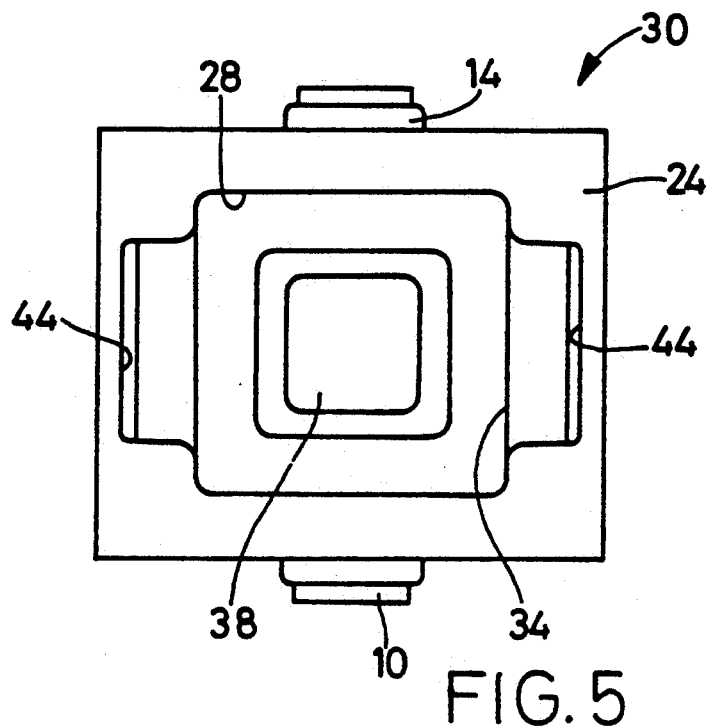
FIG. 5 is a bottom view of the inner assembly of the engine mount as viewed in the direction of arrows 5—5 of FIG. 4.

As shown in FIGS. 4 and 5, the elastic body 14 is formed between the inner sleeve 10 and the intermediate sleeve 24. The elastic body 14 is a generally annular rubber member having a relatively large wall thickness. This elastic body 14 is secured by vulcanization at its inner circumferential surface to the inner sleeve 10, and at its outer circumferential surface to the intermediate sleeve 24, to provide an inner assembly 30 as shown in FIG. 4 which consists of the inner sleeve 10, elastic body 14 and intermediate sleeve 24.

The elastic body 14 has a first and a second pocket 32, 34 formed in the diametrically opposite portions thereof, which are opposed to each other in the diametric direction in which the inner and intermediate sleeves 10, 24 are eccentric from each other. These first and second pockets 32, 34 are open in the outer surface of the inner assembly 30, through the first and second windows 26, 28 of the intermediate sleeve 24, respectively. Within the first and second pockets 32, 34, there are respectively positioned the first and second stopper portions 20, 22 protruding from the inner sleeve 10. On the end faces of the first and second stopper portion 20, 22, there are provided respective buffer rubber layers 36, 38 formed as part of the elastic body 14. Further, the elastic body 14 has two recesses 40, 42 formed in the axially opposite end portions thereof, between the inner sleeve 10 and the first and second pockets 32, 34, respectively. The axial lengths of the recesses 40, 42 as measured from the opposite axial ends of the elastic body 14 are suitably determined so as to give a desired spring characteristic to the elastic body 14. Namely, the recesses 40, 42 serve to alleviate the concentration of strain and deformation of the elastic body 14, whereby the durability of the elastic body 14 is significantly improved.

The elastic body 14 further has a pair of communication holes 44, 44 formed at diametrically opposite portions thereof, which are opposed to each other in the load-receiving direction perpendicular to the direction in which the first and second pockets 32, 34 are opposed to each other. These communication holes 44 are located adjacent the intermediate sleeve 24, and extend along the inner surface of the same sleeve 24, through respective axially intermediate portions of the elastic body 14, in the load-receiving direction. In this arrangement, the holes 44 communicate with the first and second pockets 32, 34.

The elastic body 14 further has a pair of axial voids 46 formed over the entire axial length thereof, between the communication holes 44 and the inner sleeve 10. The axial voids 46 formed are located radially inwardly of the respective holes 44, 44. Preferably, the circumferential length of each void 46 is at least one half the entire length L of the communication hole 44 as viewed in FIG. 4. With these voids 46 formed between the communication holes 44 and the inner sleeve 10, the elastic body 14 is provided with elastic walls 47, 47 which partially define the respective holes 44. These elastic walls 47 are more or less separated from the other portions, and are likely to undergo deformation independently of the other portions. Hence, the elastic walls 47 defining the holes 44 are effectively prevented from being deformed with the other portions, even when the elastic body 14 is elastically deformed upon displacement of the inner sleeve 10 relative to the intermediate sleeve 24.

The outer sleeve 12 is a generally cylindrical member having a relatively large diameter. In fabricating the elastic mount 16, this outer sleeve 12 is disposed around the above-described inner assembly 30, and the diameter of the sleeve 12 is reduced by a drawing operation using eight dies, for example, so that the sleeve 12 is fitted on the outer surface of the intermediate sleeve 24. Thus, the outer sleeve 12 and the inner assembly 30 are assembled together as shown in FIGS. 1-3. A thin-walled sealing rubber layer 48 is secured by vulcanization to the substantially entire area of the inner circumferential surface of the outer sleeve 12.

With the outer sleeve 12 mounted on the inner assembly 30, the openings of the first and second pockets 32, 34 of the elastic body 14 are fluid-tightly closed by the outer sleeve 12 and the sealing rubber layer 48. Thus, the elastic mount 16 is provided with a first and a second fluid chamber 50, 52 corresponding to the first and second pockets 32, 34, respectively. These fluid chambers 50, 52 are filled with a suitable non-compressible fluid, such as water, alkylene glycol, polyalkylene glycol, or silicone oil.

The first and second fluid chambers 50, 52 thus formed are held in fluid communication with each other, through the communication holes 44, 44 formed through the elastic body 14. Thus, the holes 44, 44 function as orifice passages 54, 54 which allow the flow of fluid therethrough between the fluid chambers 50, 52.

When a dynamic vibrational load is applied between the inner and outer sleeves 10, 12 of the engine mount 16 constructed as described above, the non-compressible fluid is forced to flow between the first and second fluid chambers 50, 52 through the orifice passages 54, 54, based on relative pressure changes which occur between these fluid chambers 50, 52. Consequently, the engine mount 16 can effectively damp or isolate the input vibrations, based on fluid flow through the orifice passages 54, or resonance of the fluid mass in the orifice passages 54. In the instant embodiment, in particular, the dimensions, such as the cross sectional area and length, of the orifice passages 54 are determined so that the engine mount 16 exhibits a satisfactory or desired damping effect with respect to engine shakes and bounce or other vibrations having relatively low frequencies, based on the resonance of the fluid mass which is forced to flow through the orifice passages 54.

In the above arrangement, in particular, the orifice passages 54 which connect the fluid chambers 50, 52 to each other consist of the communication holes 44 formed through the elastic body 14. Accordingly, the instant engine mount does not require any other members intended for forming orifice passages, resulting in a reduced number of components and simplified construction of the mount.

Since the orifice passages 54 consist of the communication holes 44 formed through the elastic body 14, there is substantially no limitation in determining the cross sectional area of the orifice passages, assuring a sufficient degree of freedom and ease in tuning the dimensions of the orifice passages. Thus, the instant engine mount can be easily tuned to a desired spring characteristic, so as to exhibit an excellent vibration damping effect.

In the instant engine mount 16, the axial voids 46 are formed between the inner sleeve 10 and the communication holes 44 which serve as the orifice passages 54. In this arrangement, the elastic walls 47 of the elastic body 14 which partially define the orifice passages 54 are effectively isolated from a relatively radially inner vibration transmitting portion of the elastic body 14 between the inner and outer sleeves 10, 12. Accordingly, even if the elastic body 14 is partially deformed at its radially inner portion upon application of vibrations between the inner and outer sleeves 10, 12, the nominal shape or dimensions of the orifice passages 54 are advantageously maintained, permitting the engine mount to stably exhibit a considerably high degree of vibration damping effect based on the fluid flow through the orifice passages 54.

Figure 6:
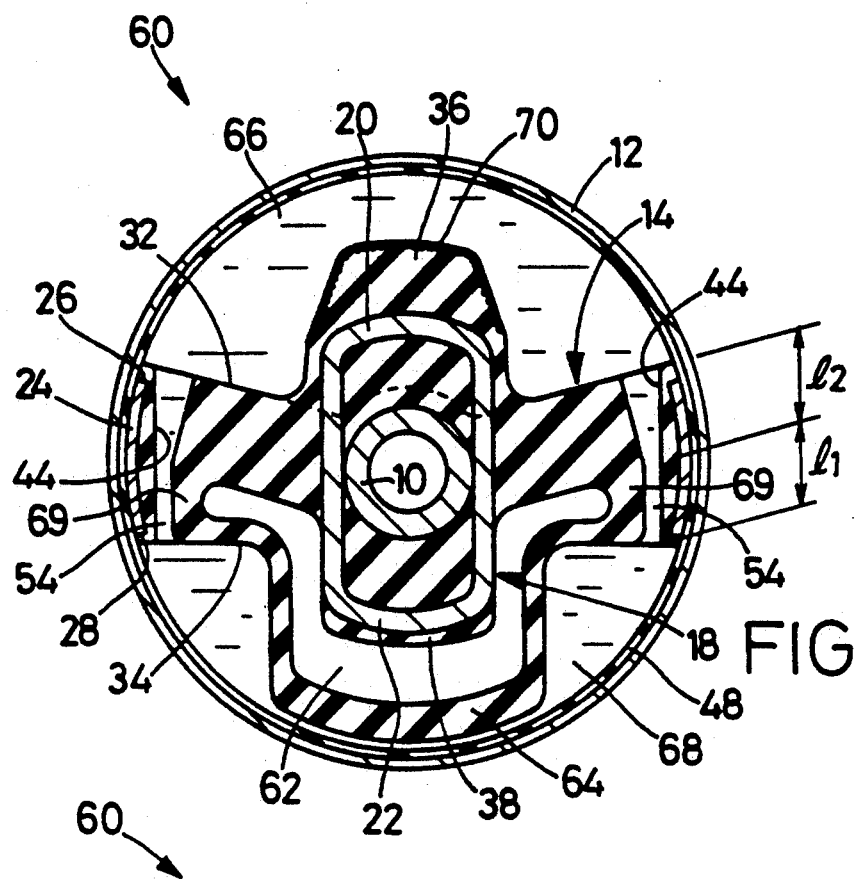
FIG. 6 is an elevational view in transverse cross section of another embodiment of the present invention.
Figure 7:
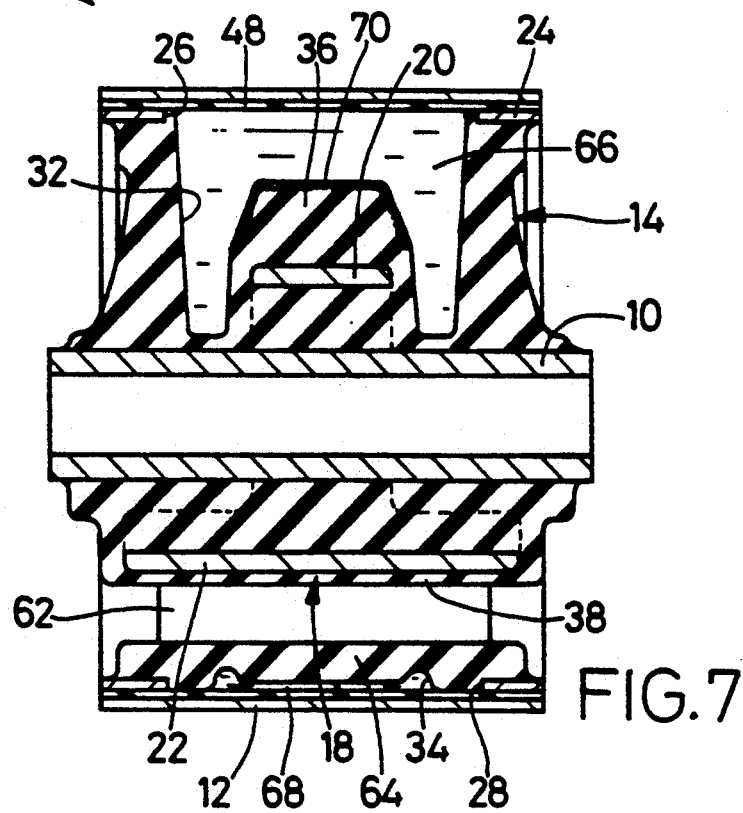
FIG. 7 is an elevational view in axial cross section of the engine mount of FIG. 6.

Referring next to FIGS. 6 and 7, there is shown a vehicle engine mount 60 as another embodiment of the present invention. In the following description, the same reference numerals as used in the first embodiment will be used to identify structurally and functionally corresponding elements, and no redundant description of these elements will be provided.

In the engine mount 60, an axial void 62 is formed over the entire axial length of the elastic body 14, between the second pocket 34 and the stopper member 18, such that the void 62 extends circumferentially along a portion of the elastic body 14 which defines the second pocket 34. This axial void 62 is effective to alleviate or prevent tensile stress which may occur in the elastic body 14 when it receives the weight of the power unit upon installation of the mount on the vehicle. Thus, the durability of the engine mount 60 is significantly improved.

With the axial void 62 thus formed, the elastic body 14 is provided with a thin-walled flexible wall portion 64 which forms a bottom wall of the second pocket 34. In this engine mount 60, when the openings of the first and second pockets 32, 34 are closed by the outer sleeve 12, the first pocket 32 provides a pressure-receiving chamber 66 which is subject to pressure changes upon application of vibrations, while the second pocket 34 provides a variable-volume equilibrium chamber 68 whose volume can be easily changed due to elastic deformation of the flexible wall portion 64.

As shown in FIG. 6, the axial void 62 extends in the circumferential direction of the mount such that the opposite circumferential ends of the void 62 are located adjacent the respective communication holes 44 (the orifice passages 54) formed through the elastic body 14. On the other hand, each of the communication holes 44 has a first portion as indicated at l1 in FIG. 6, which has a constant cross sectional area and is opposed to the corresponding one of the circumferential ends of the axial void 62, and a second portion as indicated at (2 in FIG. 6, whose cross sectional area is larger than that of the first portion l1. In the instant embodiment, in particular, the second portion l2 of the communication hole 44 is tapered such that its cross sectional area increases towards the pressure-receiving chamber 66. Generally, the cross sectional area of the hole 44 is made relatively large at its portion where the amount of deformation of the elastic body 14 is relatively large when the engine mount receives the vibrations.

The engine mount 60 having the communication holes 44 each consisting of the two portions l1, l2 exhibits a vibration damping characteristic which is determined mainly by the first portion 11 having the smaller cross sectional area. Namely, the instant engine mount 60 damps the input vibrations, based on the fluid flow through the first portion 11. In other words, the second portion 12 does not function as an effective part of the orifice passages 54 in this embodiment. Thus, only the first portions 11 of the communication holes 44 function as the orifice passages 54.

The elastic body 14 includes elastic walls 69, 69 which are formed between the void 62 and the first portions 11 of the holes 44, and which are deformed more or less independently of and separately from the other portions of the elastic body 14. Therefore, these elastic walls 69, 69 partially defining the orifice passages 54 are prevented from being deformed with a relatively radially inner portion of the elastic body 14 even when the radially inner portion are deformed upon application of the vibrations. Thus, the circumferentially opposite ends of the void 62 effectively serve to avoid undesirable transformation of the orifice passages 54.

Accordingly, as in the first embodiment, the elastic walls 69 defining the orifice passages 54 are effectively isolated from the radially inner vibration transmitting portion of the elastic body 14 between the inner and outer sleeves 10, 12. Consequently, the nominal shape or dimensions of the orifice passages 54 can be maintained even upon application of vibrations to the engine mount.

When the engine mount receives the vibrations, therefore, the non-compressible fluid is forced to flow between the pressure-receiving chamber 66 and equilibrium chamber 68 through the orifice passages 54, due to relative pressure changes which occur between these fluid chambers 66, 68. As a result, the engine mount 60 of the instant embodiment stably exhibits an intended vibration damping characteristic based on the resonance of the fluid mass in the orifice passages 54, and thus provides substantially the same effects as obtained in the first embodiment.

The second portions (2 of the communication holes 44 are not necessarily formed in tapered configuration, but may be otherwise formed provided the cross sectional area of the second portions (2 is larger than that of the first portions (1 which form the orifice passages 54. In this case, the cross sectional area of the second portions (2 should be determined so that the elastic deformation of the elastic body 14 upon application of the vibrations does not largely affect the vibration damping characteristic of the mount exhibited based on the fluid flow through the communication holes 44.

In the engine mount 60 of the instant embodiment, the buffer rubber layer 36 has an outer circumferential surface 70 which is crimped or corrugated over the entire area thereof. This buffer rubber layer 36 is adapted to limit the amount of relative displacement of the inner and outer sleeves 10, 12, with its corrugated outer surface 70 abutting on the inner surface of the outer sleeve 12, more precisely, the sealing rubber layer 48.

When the buffer rubber layer 36 abuts on the sealing rubber layer 48 upon application of a considerably large vibrational load, the friction coefficient between abutting faces of these layers 36, 48 is advantageously reduced due to the corrugated outer surface 70 formed on the buffer layer 36. After the buffer rubber layer 36 abuts on the sealing rubber layer 48 and is elastically deformed, the corrugated outer surface 70 permits easy sliding contact of these rubber layers 36, 48 for relative displacement thereof, without causing unfavorable noises, such as frictional noises, which may otherwise occur upon sliding contact between these layers 36, 48.

The effect of the corrugated outer surface 70 for reducing the friction coefficient is further strengthened due to intervention of the fluid between the abutting faces of the buffer and sealing rubber layers 36, 48, which are both positioned in the pressure-receiving fluid chamber 66.

As described above, the corrugated outer surface 70 is effective to reduce or eliminate undesirable noises, which may otherwise occur upon sliding contact between the buffer and sealing rubber layers 36, 48 after the buffer layer 36 abuts on the sealing layer 48 and elastically deforms. Therefore, the buffer rubber layer 36 may have a sufficiently large thickness without suffering from unfavorable noises, assuring a high degree of shock absorbing effect when the buffer layer 36 functions to limit the relative displacement between the inner and outer sleeves 12, 14.

While the present invention has been described above in detail in its presently preferred embodiments, for illustrative purpose only, it is to be understood that the invention is not limited to the details of the illustrated embodiments, but may be otherwise embodied.

For example, the engine mount may have only one of the two diametrically opposite orifice passages 54 which are formed between the two fluid chambers.

While the orifice passages 54 are formed adjacent the outer sleeve 12 intermediated sleeve 24) in the illustrated embodiments, it is possible to form an orifice passage or passages adjacent the inner sleeve 10 and a void between each orifice passage and the outer sleeve. This arrangement provides almost the same effect as provided in the illustrated embodiments. In the case where the orifice passages are formed adjacent the inner sleeve 10, (FIG. 8) a stopper member (18) as used in the illustrated embodiments is preferably embedded in the elastic body 14 so as to extend in the radial directions toward the opposite fluid chambers, and the orifice passages are formed so as to extend along the stopper member, so that the nominal shape of the orifice passages are favorably maintained.

In the illustrated embodiments, the axial voids 46, 62 are formed through the entire axial length of the elastic body 14 between the orifice passages 54 and the inner sleeve 10. However, such voids may be formed only in an axial portion of the elastic body 14 which defines the orifice passages 54 such that the voids are located so as to cover the length of the orifice passages. This arrangement suffices to accomplish the object of the present invention.

Although the illustrated embodiments of the present invention take the form of an engine mount for a motor vehicle, it is to be understood that the principle of the present invention is equally applicable to any other mounting devices such as suspension bushings, differential gear mounts, member mounts for motor vehicles, and mounting devices used in various equipment and machinery other than the motor vehicle.

It is also to be understood that the present invention may be embodied with various changes, modifications and improvements other than those indicated above, which may occur to those skilled in the art, without departing from the spirit and scope of the invention defined in the following claims.

What is claimed is:

1. A fluid-filled cylindrical elastic mount for flexibly connecting two members, comprising:
   an inner sleeve fixed to one of the two members;
   an outer sleeve disposed radially outwardly of said inner sleeve and fixed to the other of the two members;
   a generally annular elastic body disposed between said inner and outer sleeves for flexible connection therebetween, said elastic body partially defining two fluid chambers filled with a non-compressible fluid, said two fluid chambers being formed in diametrically opposite circumferential portions of said elastic body between said inner and outer sleeves; and
   said elastic body having at least one orifice passage defined directly and entirely surrounded by said elastic body and formed therethrough for fluid communication between said two fluid chambers, said at least one orifice passage extending through said elastic body adjacent one of said inner and outer sleeves, said elastic body further having at least one void, each of which (i) is formed between the corresponding one of said at least one orifice passage and the other of said inner and outer sleeves, (ii) has a circumferential length which is at least one-half that of the corresponding one of said at least one orifice passage, and (iii) opens to atmosphere.

2. A fluid-filled cylindrical elastic mount as defined in claim 1, wherein said at least one void is formed so as to extend over the entire axial length of said elastic body.

3. A fluid-filled cylindrical elastic mount as defined in claim 1, wherein said at least one orifice passage consists of two orifice passages formed in diametrically opposite circumferential portions of said elastic body between said two fluid chambers, while said at least one void consists of two voids formed between the other of said inner and outer sleeves and said two orifice passages, respectively.

4. A fluid-filled cylindrical elastic mount as defined in claim 3, wherein said two orifice passages extend in a circumferential direction of the mount along said outer sleeve, while said two voids are formed between said two orifice passages and said inner sleeve, respectively.

5. A fluid-filled cylindrical elastic mount as defined in claim 1, wherein said at least one orifice passage consists of two orifice passages formed in diametrically opposite circumferential portions of said elastic body between said two fluid chambers, while said at least one void consists of one axial void formed in a portion of said elastic body which defines one of said fluid chambers, said one axial void having opposite circumferential ends located adjacent said two orifice passages, respectively.

6. A fluid-filled cylindrical elastic mount as defined in claim 5, wherein said elastic body includes at least one buffer rubber layer which is formed on an outer surface of said stopper member.

7. A fluid-filled cylindrical elastic mount as defined in claim 6, wherein one of said at least one buffer rubber layer has a corrugated outer surface which abuts on said outer sleeve upon application of a vibrational load to the mount.

8. A fluid-filled cylindrical elastic mount as defined in claim 1, further comprising a stopper member provided on said inner sleeve to protrude in opposite radial directions of the mount toward said two fluid chambers, so as to limit relative displacement between said inner and outer sleeves.

9. A fluid-filled cylindrical elastic mount as defined in claim 1, further comprising an intermediate rigid sleeve fitted on an outer circumferential surface of said elastic body, said at least one orifice passage being formed between said inner sleeve and said intermediate rigid sleeve.

10. A fluid-filled cylindrical elastic mount for flexibly connecting two members, comprising:
    an inner sleeve fixed to one of the two members;
    an outer sleeve disposed radially outwardly of said inner sleeve and fixed to the other of the two members;
    a generally annular elastic body disposed between said inner and outer sleeves for flexible connection therebetween, said elastic body partially defining two fluid cambers filled with a non-compressible fluid, said two fluid chambers being formed in diametrically opposite circumferential portions of said elastic body between said inner and outer sleeves, said elastic body having at least one orifice passage defined directly and entirely surrounded by said elastic body and formed therethrough for fluid communication between said two fluid chambers, said at least one orifice passage extending through said elastic body, adjacent one of said inner and outer sleeves; and
    means for substantially preventing variations in cross-sectional area of said orifice passage due to deformation of the elastic body, said means comprising at least one void, each of which is (i) formed in said elastic body between the corresponding one of said at least one orifice passage and the other of said inner and outer sleeves, (ii) has a circumferential length which is at least one-half that of the corresponding one of said at least one orifice passage, and (iii) opens to atmosphere.

* * * * *